United States Patent

Nakaya

[15] 3,648,080

[45] Mar. 7, 1972

[54] CIRCUIT FOR INDICATING A DELAY TIME OF A DELAYED PULSE

[72] Inventor: Naohisa Nakaya, Tokyo, Japan

[73] Assignee: Iwatsu Electric Co., Ltd., Tokyo, Japan

[22] Filed: Aug. 27, 1970

[21] Appl. No.: 67,368

[30] Foreign Application Priority Data

Aug. 27, 1969 Japan....................................44/67307

[52] U.S. Cl...............................307/293, 307/234, 307/265, 307/286

[51] Int. Cl.........................................................H03k 17/28

[58] Field of Search..................307/232, 233, 234, 265, 286, 307/293

[56] References Cited

UNITED STATES PATENTS

| | | | |
|---|---|---|---|
| 3,163,824 | 12/1964 | Crain | 307/293 X |
| 3,196,358 | 7/1965 | Bagley | 307/293 X |
| 3,071,732 | 1/1963 | Martin et al. | 307/293 X |
| 3,291,993 | 12/1966 | Morgan et al. | 307/293 X |
| 3,150,273 | 9/1964 | Dym | 307/286 |
| 3,278,760 | 10/1966 | Wagner | 307/286 X |

*Primary Examiner*—John S. Heyman
*Assistant Examiner*—R. C. Woodbridge
*Attorney*—Burns, Robert E. and Emmanuel J. Lobato

[57] ABSTRACT

A delay time indicating circuit utilizes a very stable signal generator, for example, a variable frequency crystal controlled oscillator. The above-mentioned signal generator is driven synchronized with an input pulse. The first or an n'th output signal of the above-mentioned signal generator is arbitrarily extracted, thereby a pulse having a predetermined delay time can be obtained. The delay time of the obtained delayed pulse with regard to the input pulse is measured by using a delay time indicating signal generator including one or two flip-flop circuits.

7 Claims, 4 Drawing Figures

INVENTOR

BY

ATTORNEY

INVENTOR

BY

ATTORNEY

INVENTOR

BY

ATTORNEY

CIRCUIT FOR INDICATING A DELAY TIME OF A DELAYED PULSE

This invention relates to a circuit for indicating a delay time of a delayed pulse which is generated at the required delay time with regard to an input pulse.

For obtaining a delayed pulse, there were some conventional methods. The one, for example, is a method using a delay cable. The other, is a method which generates, first, a sawtooth waveform synchronized with an input signal and then generates a delayed pulse when a level of the sawtooth wave coincides with a predetermined level of a DC current or a DC voltage. The methods for indicating a delay time of a delayed pulse in the above-mentioned circuit have the drawbacks mentioned below. In the former method, the function of a delay cable is obtained in a stable condition without a jittery phenomenon. However, the loss in the cable increases in accordance with the delayed time increase and then a weight and a volume of the cable also increase, and further it is very difficult to change the delay time continuously. In the latter method, a circuit can be simply realized and the delay time can be changed continuously. However, when the delay time increases, the instability of the circuit increases and a jittery phenomenon also increases.

A principle object of the present invention is to provide a circuit for indicating a delay time of a delayed pulse which can overcome the above-mentioned drawback of the conventional method.

Another object of the present invention is to provide a circuit for indicating a delay time of a delayed pulse which, synchronizing with an input signal, drives a very stable signal generator such as a frequency variable CR oscillator or a crystal oscillator and detects the first or an $r$'th signal of the above-mentioned signal oscillator thereby obtaining a pulse delayed required time in a stable and jitterless condition.

A further object of the present invention is to provide a circuit for indicating a delay time of a delayed pulse which is effectively applicable for various types of an apparatus generating a delayed pulse at a required time with regard to input signal.

Further features and advantages of the present invention will be apparent from the ensuing description, reference being made to the accompanying drawings to which, however, the scope of the invention is in no way limited.

Figure 1A:
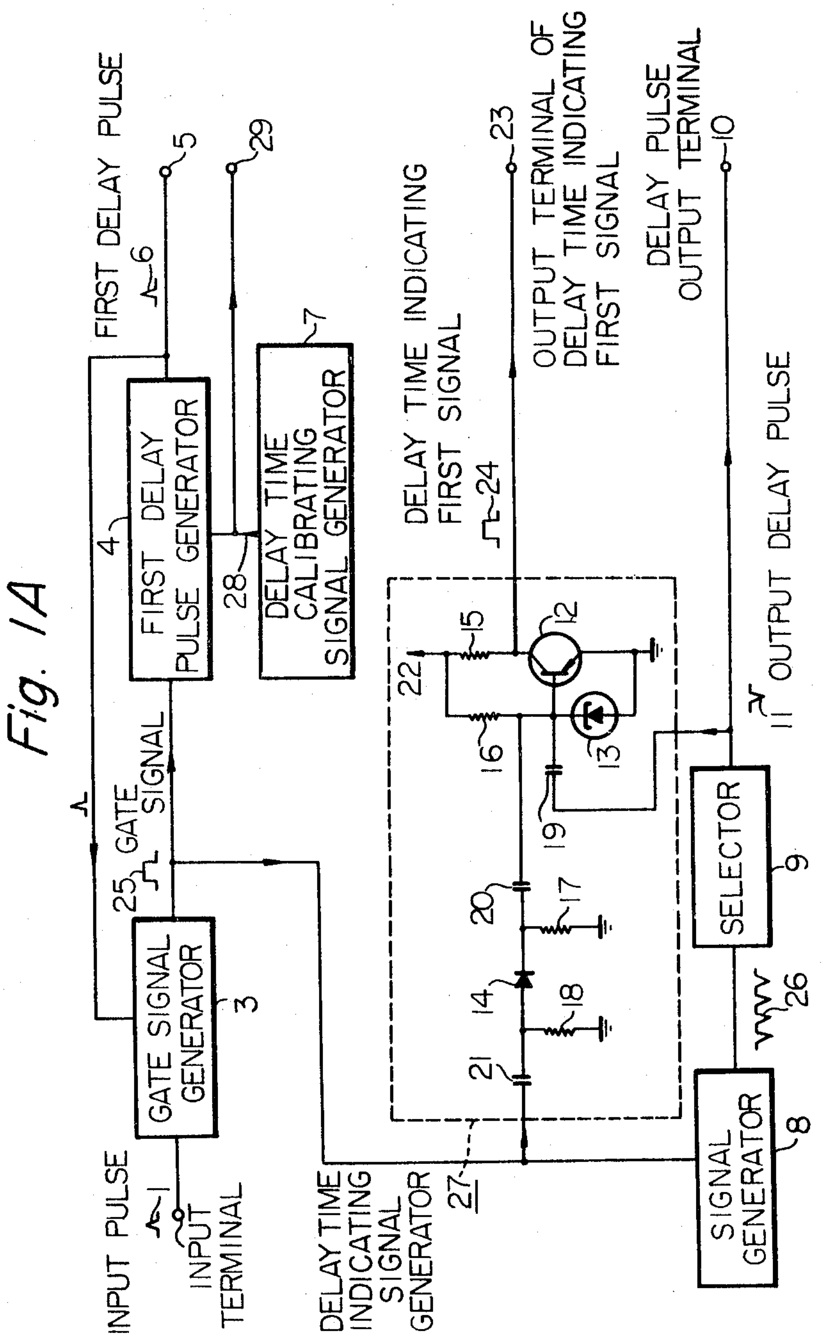
FIG. 1A is a schematic diagram of an embodiment of a circuit used in the present invention.

Referring to FIG. 1A, an input terminal 2 is connected to a gate signal generator 3 and an output of the gate signal generator 3 is connected to a first delay pulse generator 4. A delay time calibrating signal generator 7 is connected to the first delay pulse generator 4 and the output of the first delay pulse generator 4 is connected to an output terminal 5 and feeds back to the gate signal generator 3. On the other hand, the output of the gate signal generator 3 is connected to a signal generator 8 and an output of the signal generator 8 is connected to a selector 9. Further the output of the gate signal generator 3 and the output of the selector 9 are connected to the different points of a delay time indicating signal generator 27. The output of the delay time indicating signal generator 27 is connected to an output terminal 23 of the delay time indicating first signal. The output of the gate signal generator 3 is connected to a differentiation circuit composed of a capacitor 21 and a resistor 18, one terminal thereof is connected to a ground. The connection point of the capacitor 21 and the resistor 18 is connected to an anode of a diode 14, a cathode thereof is connected to a resistor 17 whose other terminal is grounded. The connection point of the resistor 17 and the cathode of the diode 14 is connected through a capacitor 20 to a cathode of a tunnel diode 13 whose anode is connected to a ground. On the other hand, a delayed output pulse of the selector 9 is connected through a capacitor 19 to the cathode of the tunnel diode 13. Further, the cathode of the tunnel diode 13 is connected to a base of a transistor 12 and through a resistor 16 to a negative potential source 22. An emitter of the transistor 12 is connected to a ground and a collector of the transistor 12 is connected through a resistor 15 to the negative potential source 22 and to the output terminal 23 of the delay time indicating first signal.

Figure 1B:
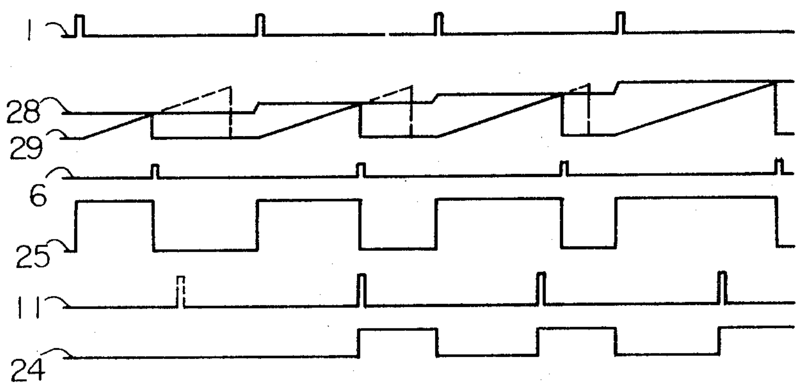
FIG. 1B shows a plurality of different signals produced by the circuit of FIG. 1A in a time relationship to one another.

When an input pulse 1 is applied to the gate signal generator 3, the gate signal generator 3 generates a gate signal 25 shown in FIG. 1B. A part of the gate signal 25 is applied to the first delay pulse generator 4 therein and generates a sawtooth wave 29 shown in FIG. 1B. By comparing the sawtooth wave 29 with an output signal 28 of the delay time calibrating signal generator 7, the first delayed pulse 6 is generated at the time determined by the sawtooth wave 29 and the output signal 28 of the delay time calibrating signal generator 7 as shown in FIG. 1B. The first delayed pulse 6 is fed back to the gate signal generator 3 and renders ceasing of the gate signal 25.

On the other hand, another part of the gate signal 25 is applied to the signal generator 8 and thereby the signal generator 8 generates an oscillation starting with the gate signal 25. The output 26 of the signal generator 8 is applied to the selector 9 which selects the first or an $n$'th signal 11 at a required delay time as an output delayed pulse. The selector 9 may comprise, for example, a conventional ring counter circuit having $n$ stages for permitting the selection of any particular pulse in the pulse train generated by the signal generator 8. That is, the first pulse applied to the ring counter will be delayed in reaching the $n^{th}$ stage for a period corresponding to the time duration between that first pulse and the occurrence of the $n^{th}$ pulse from the signal generator 8. Furthermore, the delay time determined by the selector 9 can be varied by changing the frequency of the signal generator 8 since such a change of frequency inherently produces an inversely proportional change in the delay period determined by the selector 9. If the gate signal 25 disappears before the first or an $n$'th signal 11 at a required delay time is selected, the output delay pulse 11 is not generated. If the gate signal 25 opens during the sufficient time to select the output delayed pulse 11, the output delayed pulse 11 appears at the delay pulse output terminal 10 and also is applied to the delay time indicating signal generator 27. That is, the output delayed pulse 11 is applied through a capacitor 19 to a first flip-flop circuit (bistable circuit) which is composed of the resistor 16, the tunnel diode 13 and the negative potential source 22.

On the other hand, the gate signal 25 is differentiated by the capacitor 21 and the resistor 18, and only the positive differentiated pulse is applied through the diode 14, the resistor 17 and the capacitor 20 to the cathode of the tunnel diode 13. That is, synchronizing with the gate signal 25, the tunnel diode 13 is turned to the low voltage region (off state). When the above-mentioned delayed pulse is applied to the cathode of the tunnel diode 13 in the low voltage region, the tunnel diode 13 is turned to the high voltage region. Then, the output of the first flip-flop (bistable) switches the transistor 12 and generates the delay time indicating first signal 24 at the collector of the transistor 12 and the output terminal 23. Namely, before the delayed pulse signal 11 is generated, if the gate signal 25 disappears by the function of the first delay pulse generator 4, the delayed pulse signal 11 does not generate. Accordingly, the tunnel diode 13 is always in its off condition and the signal 24 does not appear at the terminal 23. On the other hand, when the gate signal 25 is opened during the sufficient time when the pulse signal 11 generates, the pulse signal 11 is applied to the tunnel diode 13 which is maintained at its high voltage region until a next positive pulse by the next gate signal is applied. Then, the delay time indicating first signal 24 appears at the terminal 23.

As mentioned above, the read out of the delayed time determined by the selector 9 is carried out, observing the terminal 23 (or the tunnel diode 13), by adjusting the signal level 28 of the delay time calibrating signal generator 7. That is, the delayed time can be measured by reading the signal level 28 at the time that the signal 24 appears at the terminal 23. FIG. 1B shows the principle of the above-mentioned operation, especially shows the relationship comparing the sawtooth wave 29 and the signal level 28, in the first delay pulse generator 4. Also, it is necessary that the selector 9 is reset to its initial condition at the time that the gate signal 25 disappears.

Figure 2B:
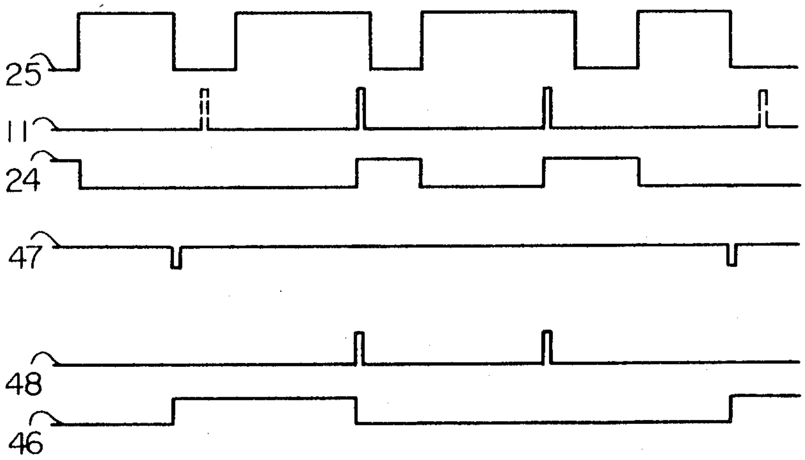
FIG. 2B shows a plurality of different signals produced by the circuit of FIG. 2A in a time relationship to one another.
Figure 2A:
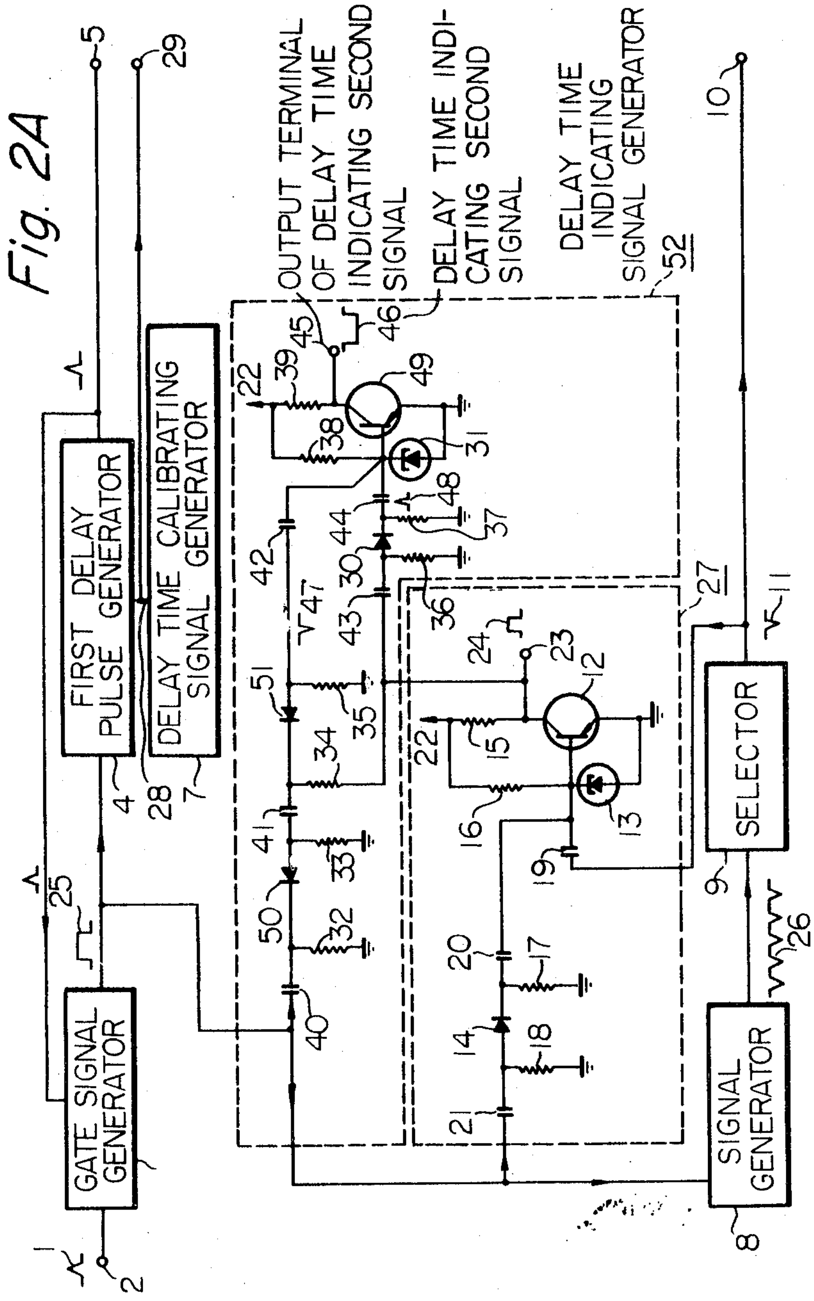
FIG. 2A is another schematic diagram of another embodiment of a circuit used in the present invention.

FIG. 2A is further added to the circuit shown in FIG. 1A a second flip-flop circuit including a tunnel diode 31, a resistor 38 and a negative source potential 22. Referring to FIG. 2A, the collector of the transistor 12 is connected through a differentiation circuit composed of a capacitor 43 and a resistor 36 to an anode of the diode 30. The cathode of the diode 30 is connected to a resistor 37 whose other terminal is grounded. The connection point of the diode 30 and the resistor 37 is connected through a capacitor 44 to a cathode of the tunnel diode 31 whose anode is connected to a ground. On the other hand, the collector of the transistor 12 is connected through a resistor 34 to a connection point of a capacitor 41 and a cathode of a diode 51. The output gate signal 25 of the gate signal generator 3 is applied to a differentiation circuit composed of a capacitor 40 and a resistor 32. The connection point of the capacitor 40 and the resistor 32 is connected to a cathode of the diode 50 whose anode is connected through a capacitor 41 to a cathode of the diode 51. The connection point of the capacitor 41 and the cathode of the diode 50 is connected through a resistor 33 to a ground. The anode of the diode 51 is connected through a capacitor 42 to the cathode of the tunnel diode 31, and the connection point of the anode of the diode 51 and the capacitor 42 is connected through a resistor 35 to a ground. The connection point of the capacitor 42 and 44 and the cathode of the tunnel diode 31 is connected to a base of a transistor 49 and to a negative source potential 22 through a resistor 38. The collector of the transistor 49 is connected through a resistor 39 to the negative source potential and to an output terminal 45 of the delay time indicating second signal. The emitter of the transistor 49 is grounded.

As mentioned above, by applying the delayed pulse 11, the tunnel diode 13 biased in the low voltage region, turns, rapidly on in the high voltage region, then, the transistor 12 turns to an on state, that is, the collector of the transistor 12 is switched in the positive direction (ground side). The output signal of the transistor 12 is differentiated by the capacitor 43 and the resistor 36, and the positive differentiated signal (the front part of the signal 24) is applied through the capacitor 44 to the cathode of the tunnel diode 31. If the period of the gate signal 25 is smaller than the delayed time, the tunnel diode 13 maintains its low voltage state, then no output signal of transistor 12 is applied to the transistor 31. At this time, the transistor 12 is in an off state, then, the diode 51 is forwardly biased to the conduction state through the resistor 34. On the other hand, the gate signal 25 is differentiated by the capacitor 40 and the resistor 32, and the negative differentiated signal (the rear part of the gate signal 25) is applied through the diode 50, the condenser 41, the diode 51 which is held in the forward bias condition, and the capacitor 42 to the cathode of the tunnel diode 31. In this case, the tunnel diode 31 turns to its high voltage state when it is in a low voltage state, or it remains in its original state when it is in a high voltage state. That is, if the delayed pulse is not generated when the gate signal 25 is opened, the tunnel diode 31 maintains its high voltage condition, then, the transistor 49 maintains its on condition and the collector of the transistor 49 remains in ground potential.

On the other hand, if the delayed pulse is generated when the gate signal is opened, the delayed pulse is applied to the transistor 12 which is switched to the positive side, that is, the ground side, and turns the tunnel diode 31 to the low voltage region. At the same time, the diode 51, which is directly connected through a resistor 34 to the collector of the transistor 12, is reversely biased until a front end of the next gate signal 25 is applied to the tunnel diode. As a result of this, even if a rear part of the differential signal of the gate signal 25 has no effect on the tunnel diode 31, then the tunnel diode 31 maintains its state at the low voltage region, and the potential of the collector of the transistor 49, that is, the potential of the output terminal becomes the potential of the negative source voltage 22.

That is, when the gate signal 25 is opened, if the delayed pulse is not generated, the output terminal 45 maintains its ground potential, and if generated, maintains its negative source potential. Accordingly, the delayed time can be measured by read out of the output signal 28 of the calibrating signal generator 7 at the time of the appearance of the indicating signal 46. FIG. 2B shows the principle of the above-mentioned operation of FIG. 2A. Also, the delayed pulse 11 in place of the signal 24 can be utilized as the signal 48.

The principle of the present invention is applicable for indicating the position in the case of the enlarged delay scanning system in the sampling oscilloscope. That is, in this case, the first delay pulse generator 4 in FIG. 1A and FIG. 2A utilized as a delayed pulse generator determining the time axis of the screen, the delay time calibrating signal generator 7 utilized as a signal generator (for example staircase generator) similar to the signal scanning the time axis of the screen, the first delayed pulse 6 is supplied to the sampling pulse generator, the signal 28 is applied from the terminal 29 to the CRT as a time base scanning signal and the delay time indicating signal 24 or 46 is applied to the CRT as a blanking or an unblanking signal. For starting a magnified delay sweep, the signal 11 is supplied as an output pulse of a magnified delay sweep to the circuit determining the time axis which is to be magnified thereby the position indicated on the screen of the CRT is synchronized with the start of the scanning after being magnified. As a result of this, the position of the magnified delay sweep can be determined.

As in the above-mentioned description, the principle object of the present invention presents a delay time indicating method which can be widely applicable and not limited to the delay pulse generator.

Modifications of the herein disclosed circuits will occur to those skilled in the art and various combinations of the circuits will be capable of use together for achieving the desired results of the invention. The scope of the invention is to be interpreted accordingly as defined by the appended claims.

What is claimed is:

1. A delay time indicating circuit comprising gate signal generating means having an input terminal for connection to a source of synchronizing signals, an output terminal for a gate signal initiated at each said synchronizing signal, and a feedback terminal for receiving a feedback pulse for terminating said gate signal; feedback signal generating means having a first input terminal coupled to the output terminal of said gate signal generating means, having a second input terminal for coupling to a variable DC voltage source, and having an output terminal from which is generated said feedback signal at a time delay from the start of the gate signal proportional to the amplitude of said DC voltage; pulse generator means having an input terminal connected to the output terminal of said gate signal generating means, and an output terminal from which is generated a train of pulses; selector circuit means for selecting an $n^{th}$ pulse of said train of pulses during the time of said gate signal, and having an input terminal connected to said output terminal of said pulse generator means, and having an output terminal from which is generated a delayed signal pulse at the time of said $n^{th}$ pulse; and, first delay time indicating means for generating an indicating signal initiated at the time of said delayed signal pulse and terminated at the initiation of the subsequent gate signal, said delay time indicating means having a first input terminal connected to receive said gate signal, a second input terminal connected to receive said delayed signal pulse, and an output terminal from which is generated said indicating signal, whereby said DC voltage can be varied and then measured at the time of generation of the first indicating signal, thereby permitting determination of the delay time of said $n^{th}$ pulse.

2. A delay time indicating circuit comprising gate signal generating means having an input terminal for connection to a source of synchronizing signals, an output terminal from which is generated a gate signal initiated at said synchronizing signal, and a feedback terminal for receiving a feedback pulse for terminating said gate signal; feedback signal generating means having a first input terminal coupled to the output terminal of said gate signal generating means, having a second input terminal for coupling to a variable DC voltage source, and including a sawtooth generator circuit for generating a sawtooth wave initiated upon reception of the leading edge of said gate signal, a pulse generating circuit having an output terminal from which is produced said feedback pulse when the amplitude of said sawtooth wave reaches a DC value at said second input terminal; pulse generator means having an input terminal connected to the output terminal of said gate signal generating means, and an output terminal from which is generated a train of pulses for the duration of each said gate signal; selector circuit means for selecting an $n^{th}$ pulse of said train of pulses, said selector circuit means having an input terminal connected to said output terminal of said pulse generator means, and having an output terminal from which is generated a delayed signal pulse at the time of said $n^{th}$ pulse; and, first delay time indicating means for generating an indicating signal initiated at the time of said delayed signal pulse and terminated at the initiation of the subsequent gate signal, said delay time indicating means having a first input terminal connected to receive said gate signal, a second input terminal connected to receive said delayed signal pulse, and an output terminal from which is generated said indicating signal, whereby said DC voltage can be varied and then measured at the time of generation of the first indicating signal, thereby permitting determination of the delay time of said $n^{th}$ pulse.

3. The invention as set forth in claim 2, in which said delay time indicating means comprises a flip-flop circuit having input means for causing said flip-flop to change from its original state at the time of each said delayed signal pulse, and to change back to its said original state at the time of initiation of the next succeeding gate signal.

4. The invention as set forth in claim 2, further comprising second delay time indicating means for generating a signal which is initiated at the time of said delayed signal and which is terminated at the simultaneous condition of the absence of said first delay time indicating signal and the termination of said gate signal.

5. The invention as set forth in claim 4, in which said second delay time indicating means has a first input terminal connected to receive said gate signal, a second input terminal connected to receive said first delay time indicating signal, and an output terminal form which is generated said second delay time indicating signal.

6. The invention as set forth in claim 5, in which said second delay time indicating means comprises a flip-flop circuit having input means for causing said flip-flop to change from its original state at the time of reception of said first delay time indicating signal, and to change back to its said original state at the time of termination of said gate signal during an absence of said first delay time indicating signal.

7. A delay time indicating circuit comprising means for generating a gate signal having a duration proportional to a variable DC voltage source, pulse generator means connected to said gate signal means for generating a train of pulses in response to said gate signal, selector circuit means coupled to said pulse generator means for selecting an $n^{th}$ pulse and generating an output pulse at the time of said $n^{th}$ pulse, and delay time indicating means having said gate pulse and output pulse coupled thereto for generating an indicating signal initiated at the time of said output pulse and terminated at the initiation of the next succeeding gate pulse.

* * * * *